United States Patent [19]

Grant

[11] 4,072,989

[45] Feb. 7, 1978

[54] AUDIO-VISUAL PRESENTATION DEVICE

[75] Inventor: Robert Eugene Grant, Shoreview, Minn.

[73] Assignee: Minnesota Mining and Manufacturing Company, St. Paul, Minn.

[21] Appl. No.: 647,200

[22] Filed: Jan. 7, 1976

[51] Int. Cl.² ............... G03B 31/00; G11B 31/00
[52] U.S. Cl. .................................. 360/80; 353/15
[58] Field of Search ........... 353/15; 352/17; 35/8 A; 360/80, 79

[56] References Cited

U.S. PATENT DOCUMENTS

| 2,787,669 | 4/1957 | Flan et al. | 35/8 A |
|---|---|---|---|
| 2,975,672 | 3/1961 | Shields | 360/80 |
| 3,257,515 | 6/1966 | Nakamatsu | 242/188 |
| 3,276,315 | 10/1966 | Chalfin | 353/15 |
| 3,447,864 | 6/1969 | Shadley | 352/17 |
| 3,756,715 | 9/1973 | Naf | 360/80 |
| 3,772,473 | 11/1973 | Parham | 360/80 |

FOREIGN PATENT DOCUMENTS

| 926,498 | 5/1973 | Canada | 353/15 |

*Primary Examiner*—Steven L. Stephan
*Attorney, Agent, or Firm*—Cruzan Alexander; Donald M. Sell; Robert L. Marben

[57] ABSTRACT

An audio-visual presentation device including a magnetic cassette tape drive and circuitry adapted in a normal automatic forward mode for reproducing audio signals from one track of the cassette tape and for controlling a remotely controllable slide projector in response to signals from a second track of the cassette tape such that the audio signals and slide projector visual presentation remain in synchronization. The device includes a manual reverse switch to permit the device operator to repeat portions of the audio-visual presentation, the switch when in a first position providing normal automatic forward operation in a first tape drive mode and when in a second position providing in a second tape drive mode reverse operation at a higher speed with the audio output muted and the signals from the second track of the tape controlling the projector to cycle in a reverse direction. Electrical circuitry connected to the manual reverse switch responds to movement of such switch from the second to the first position to provide control for transporting the tape to the visual advance signal immediately preceding the audio signal portion corresponding to the slide being shown by the projector when the switch is changed from the second to the first position whereby the device is returned to normal automatic forward mode prior to the beginning of the audio signal portion corresponding to such slide. The electrical circuitry also prohibits tape drive direction changes when visual advance signals are being detected from the second track of the tape and when the projector is cycling such that synchronization of the audio output and the slide projector display is maintained irrespective of movement of the switch between its first and second positions.

12 Claims, 8 Drawing Figures

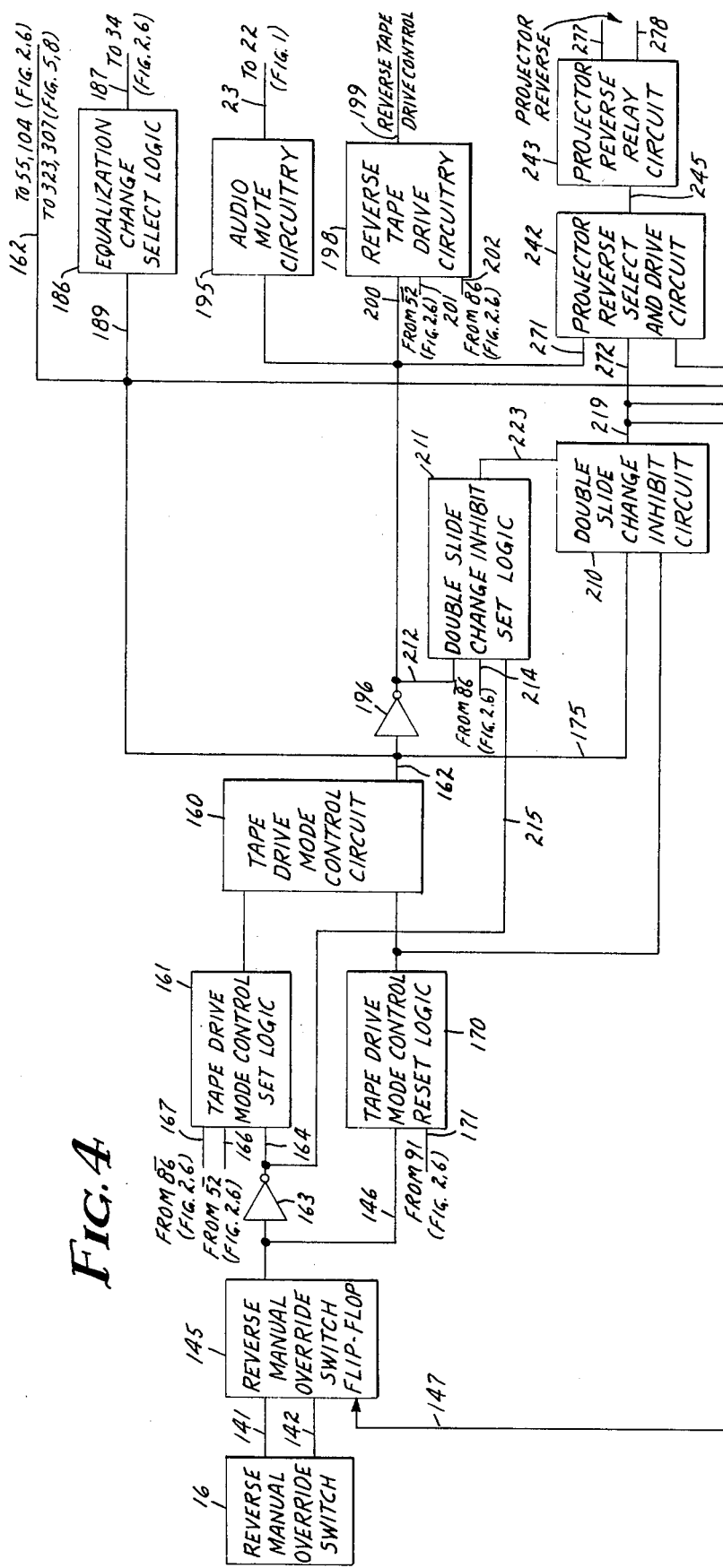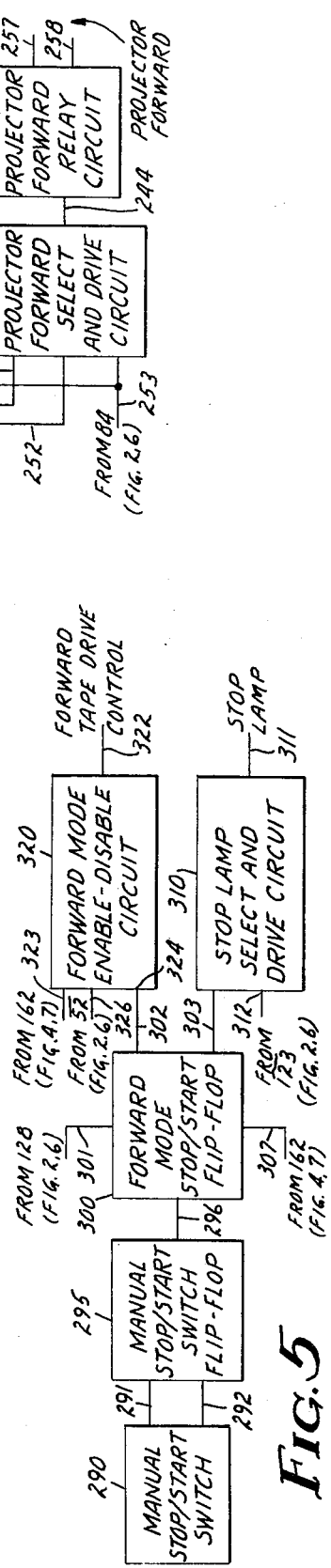

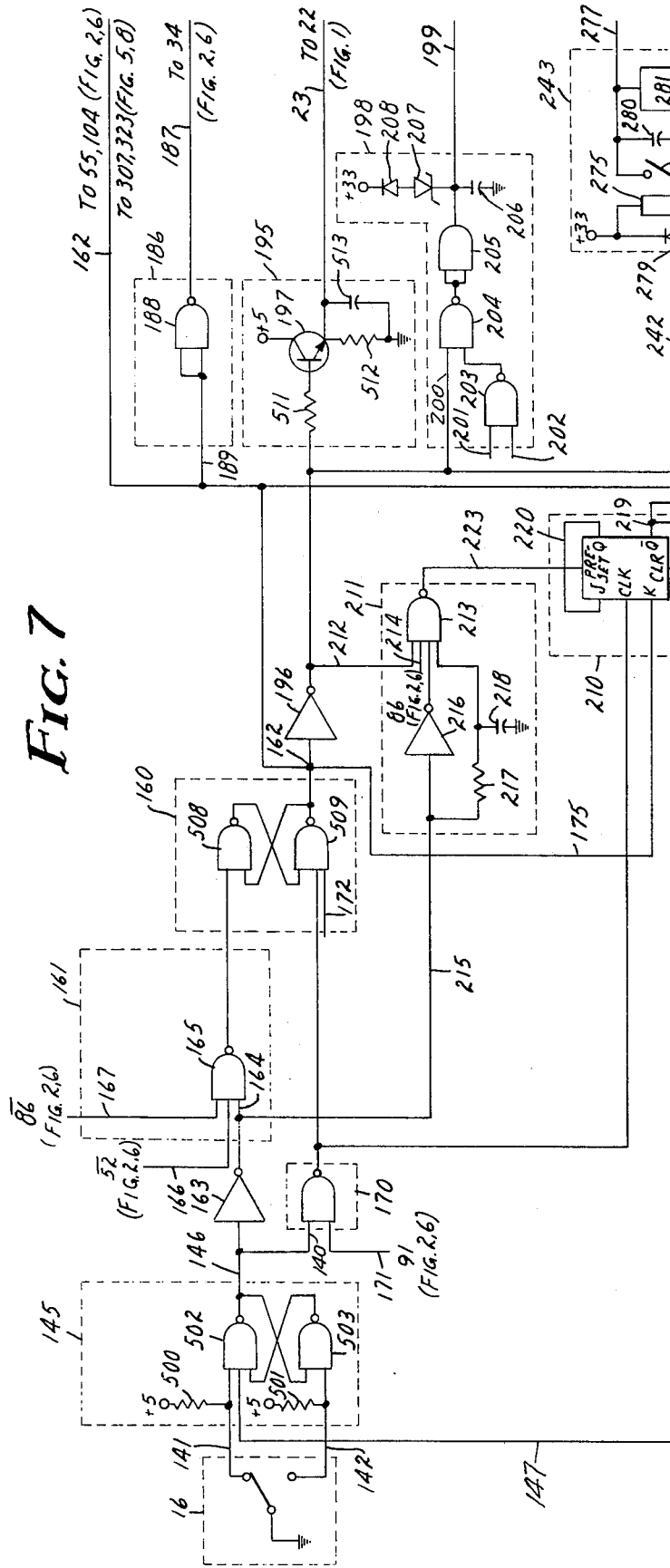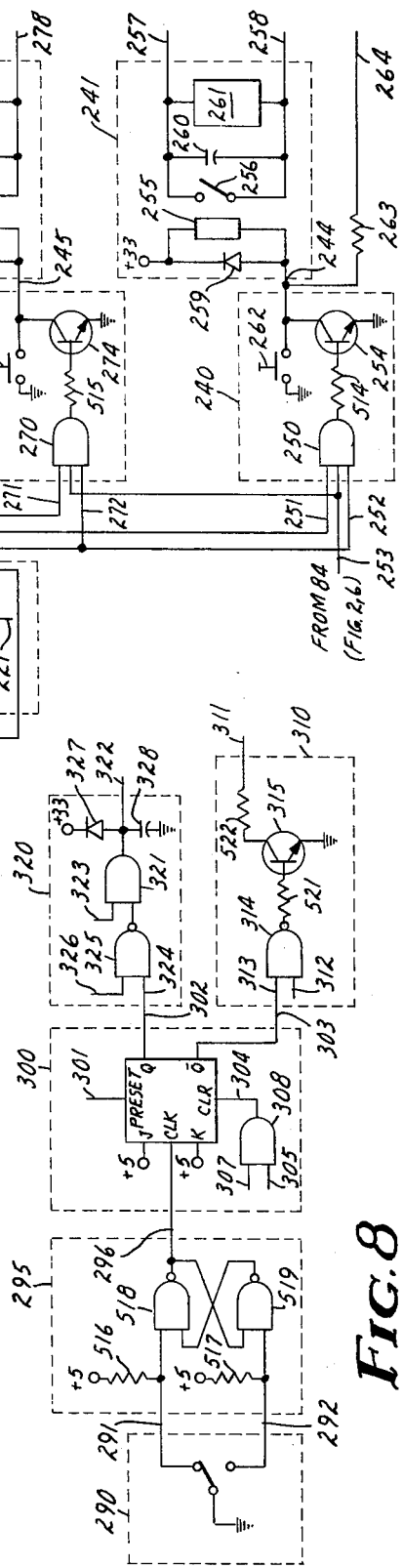
FIG. 7
FIG. 8

AUDIO-VISUAL PRESENTATION DEVICE

BACKGROUND OF THE INVENTION

1. Field of the Invention

The invention relates in general to audio-visual devices; and more particularly to audio-visual devices for providing audio output and synchronized control of an optical projector in response to prerecorded signals on a magnetic tape.

2. Description of the Prior Art

Audio-visual devices for providing audio output and control of an optical projector having a single frame advance mechanism in response to prerecorded signals on a magnetic tape are generally known. A magnetic tape for such a device contains a sequence of audio portions each of which portion corresponds to a frame to be shown by the optical projector. Each such audio portion is preceded in time sequence by a visual advance control signal on the tape. Once the projector and audio signals have been initially sychronized, during a normal automatic forward operation such a device provides audio output in response to the audio portions detected from the tape and control to advance the single frame advance mechanism of the projector one cycle in response to each visual advance control signal detected from the tape such that the audio output and display of the optical projector remain in synchronization as the tape is played by the device.

An important feature in such a device is the capability for the operator to override the normal automatic forward operation by actuation of manual switching to command the device to drive the tape at increased speed in the reverse direction with the audio muted to provide a review mode. U.S. Pat. No. 3,756,715 describes a device having an auto-manual switch which provides normal automatic forward operation in the auto position. When the switch is changed to the manual position, the visual advance control signals on the tape are used by the device to stop the tape only. Once the tape is stopped in manual mode, the operator must initiate a command to cycle the projector one cycle in an appropriate direction by pressing a separate forward or a separate reverse switch with the next visual advance control signal on the tape in the appropriate direction again stopping the projector. Such a device is not as convenient as may be desired in manual override mode, however, because it requires a separate command from the operator for each projector cycle and requires the operator to wait until the tape stops before again activating the device.

Another known techinque for providing a review mode feature in such a device is to override the normal automatic forward operation by actuation of a manual switch to command the device to drive the tape at an increased speed in reverse direction with the audio output muted and the optical projector being cycled in response to visual advance signals detected from the tape. Telex Corporation has marketed a device having a manual override key with a first position that enables normal automatic forward operation and a second position that enables the review mode. Such device in response to movement of the manual override switch from the second to the first position resumes normal automatic forward operation. Very often the audio resumes in the midst of an audio portion which is confusing to a person observing the presentation. Also, such device often gets out of synchronization such that the audio output portion for one frame is presented with the visual display of a different frame to produce an embarassing and distracting effect.

SUMMARY OF THE INVENTION

An improved automatic audio-visual presentation device with a manual override switch control that when returned from manual override to automatic mode automatically begins the audio output to include the entire audio signal portion corresponding to the frame currently being shown by an associated optical projector. The improved device also maintains synchronization of the audio output and optical projector display irrespective of when the position of such manual override switch is changed.

The present invention, like the prior art, has a first manually actuated switch means having first and second positions which when in the first position provides normal automatic forward operation at a first tape drive speed and when in the second position provides control to the tape drive for operation at a higher speed with visual advance control signals provided on the tape controlling an optical projector when the switch means is in either position. Unlike the prior art, the present invention provides circuit means connected to the first switch means which in response to movement of the first switch means from its second to its first position at the time a given frame is shown provides tape drive control for transporting the tape to the visual advance control signal that in normal automatic forward mode immediately precedes the audio signal portion that corresponds to such frame, and then enables normal automatic forward operation such that audio output of the device is enabled to include the entire audio signal portion corresponding to such frame.

Such circuit means also maintains synchronization between the audio output and optical projector irrespective of when the first switching means is moved in either direction between its two positions. It provides a visual advance detection signal when one of the visual advance signals is being detected from the tape and prohibits tape drive direction changes in response to this signal. The circuit means also provides a projector cycling signal concurrent with the cycling of the projector in response to one of the visual advance signals and prohibits tape drive direction changes in response to such signal. If the tape drive direction were to change during the existence of these signals, there is a significant probability that the audio output portions and the display of the optical projector would go out of synchronization. For example, without such protection, a tape drive direction change could cause the device to produce two projector command pulses in close timed relationship such that the projector could not follow the second command pulse.

The present invention has circuitry that detects only a continuous series of single cycles of one of the visual advance signals on the magnetic tape and in response thereto provides a single frame advance command to the optical projector. Such circuitry includes a filter means for detecting single cycles of visual advance signals of a designated frequency band, means connected to the output of the filter means for detecting only an unbroken series of single cycles of the designated frequency band, and a trigger means connected to the output of the unbroken series detection means for providing a single frame advance command to the optical projector in response to the output of the unbroken series detecting means. Such circuitry provides a high level of noise immunity which helps to maintain the audio output and optical projector in synchronization.

In the preferred embodiment of an audio-visual presentation device according to the present invention, the magnetic tape is a standard magnetic tape cassette and the optical projector is a slide projector. Other types of magnetic tape, such as reel to reel, and other types of optical projectors with remotely controllable single frame advance mechanisms, such as a film strip projector, could be used, however.

In the preferred embodiment the first switching means, when in its second position, commands the tape drive means to transport the tape in the reverse direction at the second (increased) speed to provide a manual skip-back mode. However, the feature of the present invention that re-enables normal automatic operation such that the audio output of the device includes the entire audio signal portion corresponding to the frame being shown by the optical projector when the first switch means is changed from its second to its first position can also be used in a manual skip-ahead mode wherein the first switch means when in its second position commands the tape drive means to move the tape in the forward direction at the second (increased) speed.

BRIEF DESCRIPTION OF THE DRAWING

FIG. 4 is a detailed block diagram of the reverse mode and enable logic block, the projector command logic block plus the reverse tape drive control, projector forward and projector reverse portions of FIG. 1;

FIG. 5 is a detailed block diagram of the forward mode and enable logic block and the forward tape drive control portion of FIG. 1;

FIG. 7 is a circuit diagram for the block diagram of FIG. 4; and

FIG. 8 is a circuit diagram for the block diagram of FIG. 5.

DESCRIPTION OF THE PREFERRED EMBODIMENT

The preferred embodiment is an audio-visual presentation device that detects prerecorded signals from a standard two track cassette magnetic tape and provides control of a remotely controllable slide projector, control of the device's cassette tape drive means and audio output in response to such signals. One track of the tape provides control signals to the device and the other track provides signals to be reproduced for audio output. The control signals on the tape are pursuant to the American National Standard Institute Standard PH7.4-1975 wherein a visual advance control signal is 1000 Hz for 0.45 seconds and a program stop signal is 150 Hz for 0.45 seconds.

The device has a first manual switching means that when in a first position provides via electrical circuits normal automatic forward operation at a first tape speed with a capstan advancing the tape past the two track tape head. In a second position the first switching means provides control via electrical circuits to drive the cassette tape in reverse at a second tape speed that is 4½ to 10 times the speed used for normal forward operation. The reverse tape drive at the second speed is provided by driving the supply spindle of the cassette. During such reverse winding the visual advance signals detected from the tape control the slide projector and the audio output is muted.

Figure 1:
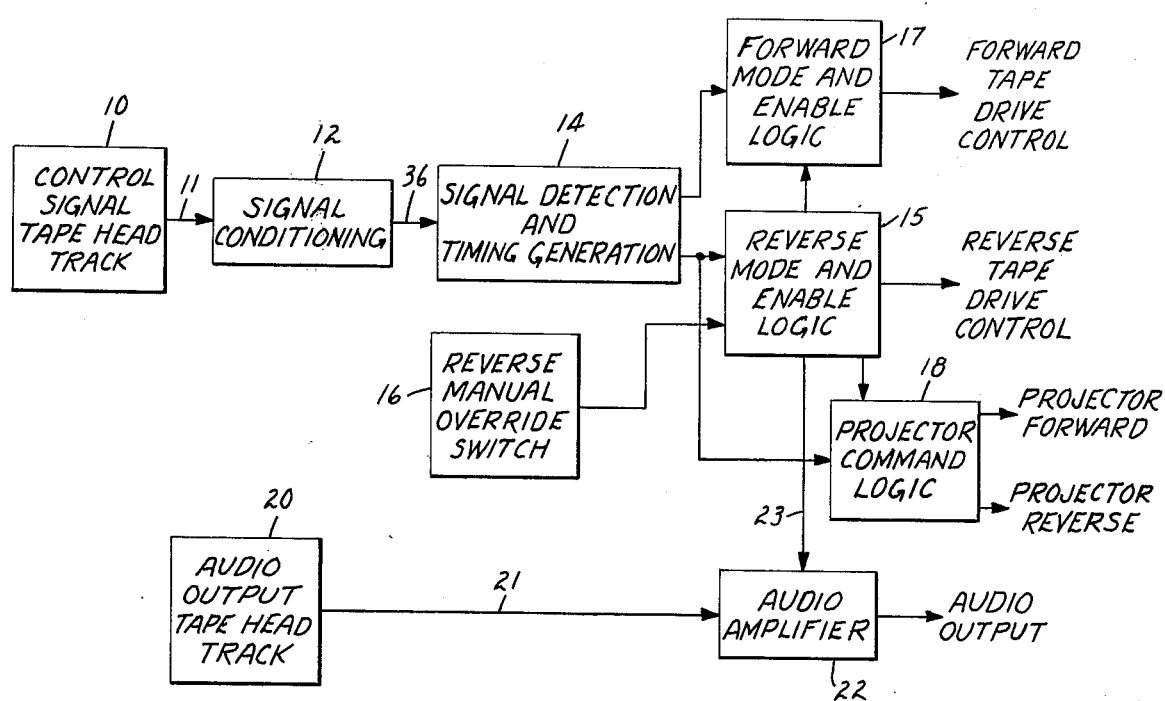
FIG. 1 is a block diagram of an audio-visual presentation device according to the present invention.

FIG. 1 shows a block diagram of the electrical circuitry of the preferred emobidment. One track 10 of a tape head detects control signals from the magnetic tape during both forward and reverse movement of the tape when synchronization between the audio and visual are desired. The control signals when detected are presented via connection 11 to signal conditioning circuitry 12. The output 36 of the signal conditioning circuitry 12 is connected to the signal detection and timing generation circuitry 14 wherein the control signals are detected according to their respective frequencies and then used to generate timing pulses.

Reverse mode and enable logic 15 in response to timing pulses from circuitry 14 and a first switching means in the form of reverse manual override switch 16 provides forward and reverse direction mode control for the device as well as reverse tape drive control for the device. Forward mode and enable logic 17 in response to timing pulses from circuitry 14 and the direction mode control from logic 15 provides forward tape drive control. Projector command logic 18 in rsponse to timing pulses from circuitry 14 and the direction mode control from logic 15 provides forward and reverse commands for the remotely controllable projector.

The other track 20 of the tape head detects audio output signals from the magnetic tape which are applied to an audio amplifier 22 via connection 21. A muting signal is also provided by the direction mode control of circuitry 15 and applied to the audio amplifier 22 via connection 23.

Figure 2:
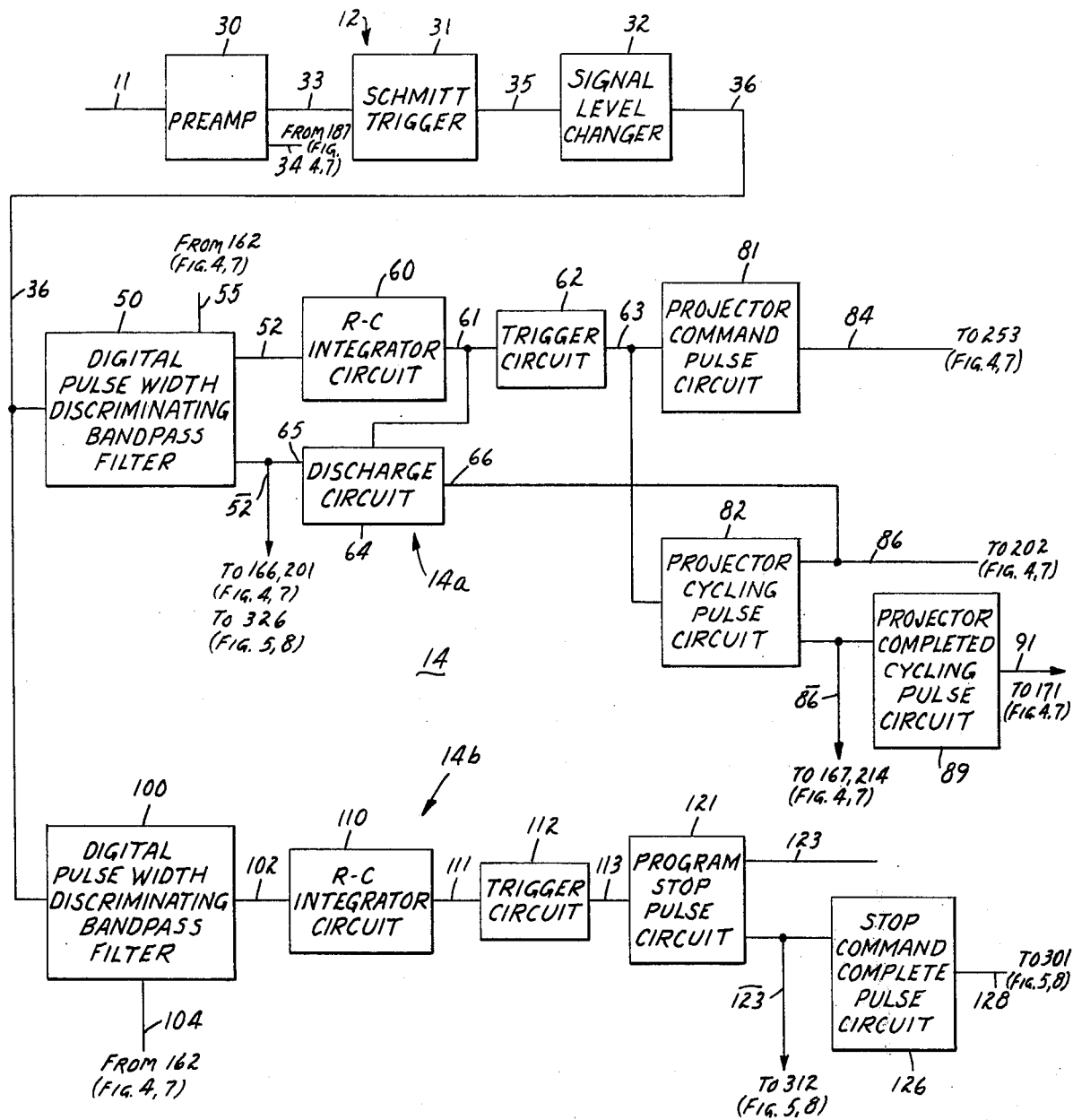
FIG. 2 is a detailed block diagram of the signal conditioning block and the signal detection and timing generation block of FIG. 1.

With reference to FIG. 2, the signal conditioning circuitry 12 includes a preamplifier 30, a Schmitt trigger 31 and a signal level changer 32. The preamplifier 30 receives control signals from track 10 of the tape head via the connection 11 and amplifies such signals to provide approximately a 2 volt rms sine wave at its output 33. A control input 34 to preamplifier 30, the source of which will be further described later, changes the frequency response equalization of the preamplifier 30 during reverse tape drive at the second speed such that the output 33 is approximately of nominal magnitude despite the magnitude of signal level induced in track 10 of the tape head being increased due to the greater changes of magnetic flux per unit time that result from the increased tape speed. The signal at output 33 provides the input signal to Schmitt trigger 31. The Schmitt trigger has approximately 0.4 volt rms of hysteresis and provides at its output 35 a square wave of a frequency corresponding to the frequency of the signal at its input. The square wave at output 35 provides the input signal to level changer 32 which operates to provide a TTL logic level square wave signal at its output 36 whose frequency corresponds to the frequency of the signal at connection 11 detected from the tape.

The signal detection and timing generation circuitry 14 includes a visual advance signal circuit portion 14a and a program stop signal circuit portion 14b with each of such circuit portions receiving the logic level signals at output 36 of the signal conditioning circuit 12. The visual advance signal circuit portion includes a filter means in the form of a digital pulse width discriminating bandpass filter 50 to detect visual advance signals of nominal frequency 1000 Hz. The filter 50 during normal automatic forward operation detects the signals at output 36 of the signal conditioning circuitry 12 whose positive half cycle is greater than 360 microseconds in width and less than 600 microseconds in width and whose whole cycle is less than 1.5 milliseconds. In response to each such detected signal a logic 1 level is provided for 1.5 milliseconds at output 52. Thus, as long as signal at output 36 has positive half cycle widths between 360 and 600 microseconds and a whole cycle width less than 1.5 milliseconds, a continuous logic 1 level will exist at output 52; and whenever the signal at output 36 does not so qualify, output 52 will have a logic 0 level. The filter 50 also has an output $\overline{52}$ which provides a visual advance detection signal that is the inverse of the signal at output 52. A signal at control input 55 of filter 50, the source of which will be further described later, changes the bandpass of the filter 50, such that during reverse mode at the second tape drive speed, the filter 50 passes input signals having a positive half cycle width between 33 and 273 microseconds and a whole cycle width less than 720 microseconds.

As long as a signal on conductor 36 of the designated frequency for a visual advance signal is presented to bandpass filter 50, output 52 will be a logic 1 and an integrator 60 provides an increasing signal level at its output 61. A trigger means in the form of a trigger circuit 62 is connected to output 61 and turns on to yield a logic 0 level at its output 63 whenever output 61 reaches the trigger level for circuit 62. A quick discharge circuit 64 which together with integrator 60 forms an unbroken series detecting means is connected to the integrator circuit 60 and discharges the integrator whenever a logic 1 level is presented at inputs 65 or 66. The output $\overline{52}$ of filter 50 is applied to input 65 to cause the circuit 64 to quickly discharge the integrator whenever a cycle of the visual advance signal of the designated frequency is not detected by the bandpass filter 50. Thus, the output 61 of the integrator 60 supplies a signal to the trigger circuit 62, which increases in level provided only an unbroken sequence of cycles of visual advance signal of the designated frequency are presented to the signal conditioning circuit 12. The time constant of the integrator 60 and the trigger level of the circuit 62 are selected such that the circuit 62 will trigger when approximately 15 consecutive visual advance cycles of the designated frequency have been detected. By requiring a sequence of consecutive visual advance cycles, the quick discharge circuit 64 provides very reliable triggering and protects against false projector commands which might be caused by extraneous noise to put the audio output and projector display out of synchronization.

Output 63 is connected to a projector command pulse circuit 81 and a projector cycling pulse circuit 82 which are triggered when trigger circuit 62 turns on to produce a logic 0 at its output 63. Circuit 81 is a one-shot type timer that produces a positive projector command pulse having a 0.45 second width at its output 84 when triggered which is used by the projector command logic 18 as later described. Circuit 82 is also a one-shot type times that produces a positive projector cycling pulse at its output 86 and a negative projector cycling pulse at its output $\overline{86}$. The pulses at outputs 86 and $\overline{86}$ have a width of 0.9 second, which time is selected to approximately equal the cycling time of the remotely controllable projector. A projector completed cycling pulse circuit 89 which is a one-shot circuit is connected so as to be triggered by the trailing edge (rising edge) of the negative pulse on output $\overline{86}$ to provide a brief (several hundred nanoseconds in width) positive projector completed cycling pulse at its output 91. The positive projector cycling pulse at output 86 is fed back to input 66 of quick discharge circuit 64 to prevent the trigger circuit 62 from initiating circuit 81 to provide a second projector command pulse at output 84 in response to one visual advance signal on the tap should any abnormal condition such as momentary dropout of the visual advance signal occur.

The program stop circuit portion 14b of the signal detection and timing generation circuitry 14 includes a digital pulse width discriminating bandpass filter 100 for detecting program stop signals of nominal frequency 150 Hz that may be presented on the control signal track of the tape. The filter 100 detects the signals presented at output 36 whose positive half cycle is greater than 2.35 milliseconds and whose whole cycle is less than 9.24 milliseconds in width. In response to each such detected signal a logic 1 level is provided for 9.24 milliseconds at output 102. Thus, as long as a signal present at 36 has positive half cycle widths greater than 2.35 milliseconds and a whole cycle width less than 9.24 milliseconds, a continuous logic 1 level will exist at output 102; and whenever the signal at 36 does not so qualify, output 102 will have a logic 0 level. An inhibit signal presented to the control input 104 of filter 100 disables the output 102 whenever the device is in reverse mode at the second tape drive speed since it is desired that in such mode that the detected visual advance signals from the tape be detected and utilized while other signals on the tape that are detected be inhibited from providing an output at 102.

An integrator circuit 110 comprising an R-C network connectd to the output 102 is also a part of the program stop signal circuit portion 14b. As long as a signal of the designated frequency is present at 36 to the input to bandpass filter 100, output 102 will be a logic 1 and integrator 110 provides an increasing signal level at its output 111. A trigger circuit 112 is connected to output 111 and turns on to yield a logic 0 level at its output 113 whenever output 111 reaches the trigger level for circuit 112. The time constant of the integrator 110 and the trigger level of the circuit 112 are selected such that the circuit 112 will trigger only after several cycles of the designated frequency have been detected.

Output 113 is connected to a program stop pulse circuit 121, also a part of circuit portion 14b, such that when the trigger circuit 112 is turned on, a logic 0 is produced at the output 113 to pulse circuit 121. Circuit 121 is a one-shot type timer that produces 0.45 second output pulses or pulses the width of the signal at output 113 if such signal is longer. A positive program stop pulse is produced at output 123 and a negative program stop pulse is produced at output $\overline{123}$. A stop command complete pulse circuit 126, also a part of circuit portion 14b, is triggered by the trailing edge (rising edge) of the negative pulse on output $\overline{123}$ to provide a brief (several hundred nanoseconds in width) negative stop command complete pulse at its output 128.

Figure 3:
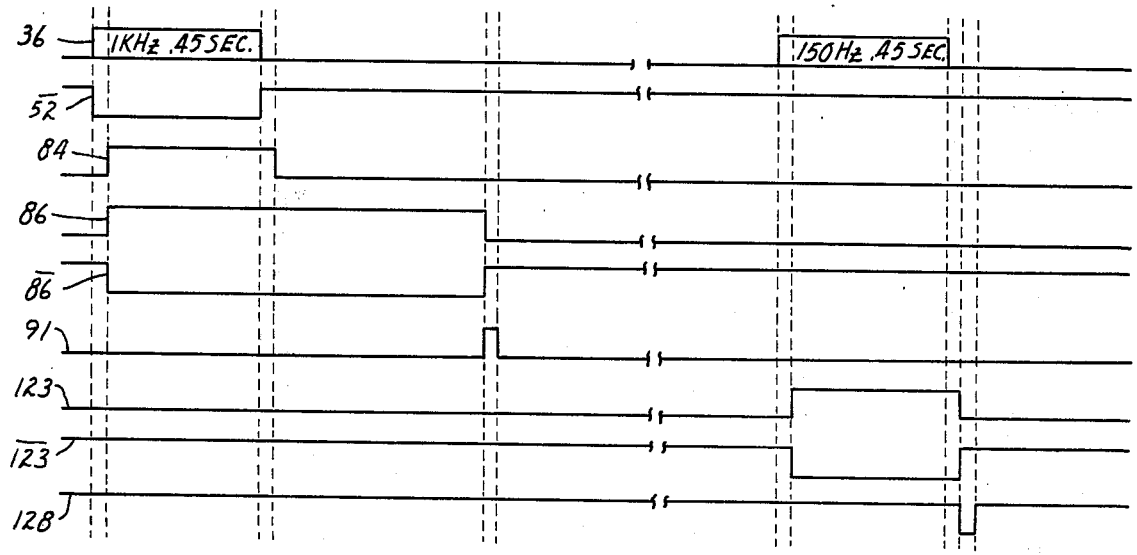
FIG. 3 is a number of signal timing patterns used in describing the invention.

To summarize briefly, FIG. 3 represents example timing pulses generated at the various outputs of the signal detection and timing generation circuitry 14. In response to a 1000 Hz logic level square wave signal that is of 0.45 seconds duration at the output 36 of the signal conditioning circuit 12, the visual advance circuit portion 14a provides a visual advance detection signal at the output 52 of filter 50 that is a logical 0 whenever one cycle of the designated visual advance frequency is detected. After a sequence of approximately 15 consecutive visual advance cycles of the designated frequency, the visual advance circuit portion 14a provides a 0.45 second positive projector command pulse at output 84, a 0.9 second positive projector cycling pulse at output 86, and a 0.9 second negative projector cycling pulse at output $\overline{86}$. Upon completion of the pulse at output $\overline{86}$, the visual advance circuit portion 14a provides a brief positive projector completed cycling pulse at output 91.

In response to a 150 Hz logic level square wave signal on output conductor 36 from the signal conditioning circuit 12 that is of 0.45 seconds duration and after several cycles of the designated frequency, the program stop circuit portion 14b provides a 0.45 second positive program stop pulse at output 123 and a 0.45 second negative program stop pulse at output $\overline{123}$. Upon completion of the pulse at output $\overline{123}$, the program stop circuit portion 14b provides a brief negative stop command complete pulse at output 128.

Referring to FIG. 4, a more detailed block diagram is shown for the reverse mode and enable logic portion 15 and includes a reverse manual override switch flip-flop 145 used with the reverse manual override switch 16, an inverter 163, a tape drive mode control circuit 160 controlled by a tape drive mode control set logic 161 and reset logic 170 plus a double slide change inhibit circuit 210, an inverter 196 and double slide change inhibit set logic 211.

The first manual switching means, referred to earlier as reverse manual overrride switch 16 in connection with FIG. 1, is also shown in FIG. 4. Switch 16 when in its first position, the normal automatic forward position' provides a logic 0 on output 141. As will be seen, when switch 16 is in its second position, a logic 0 is provided at output 142 to provide manual override control to drive the tape in reverse at the second tape drive speed with the visual advance signals on the tape controlling the optical projector and with the audio output being muted.

The reverse switch flip-flop 145 is connected to the outputs of switch 16 and provides switch contact bounce protection. When switch 16 is in its first position, flip-flop 145 is in its first state, whereby output 146 is a logical 1; and when switch 16 is in its second position, flip-flop 145 is in its second state except if a logical 0 signal applied to input 147, under conditions to be described later, inhibits flip-flop 145 from entering its second state.

The tape drive mode control 160 is controlled by the reverse switch flip-flop 145 via set logic 161 and reset logic 170. Output 162 of the tape drive mode control circuit 160 is a logical 1 during normal automatic forward operation and a logical 0 during reverse tape drive at the second tape speed.

When manual switch 16 is changed from its first to its second position, output 146 of flip-flop 145 changes from a logical 1 to 0 thus applying via inverter 163 a logical 1 at input 164 of set logic 161. A second input 166 of set logic 161 is connected to the output 52 of filter 50 (FIG. 2) at which a negative visual advance detection signal is presented when detected and a third input 167 associated with set logic 161 is connected to the output $\overline{86}$ at which a negative projector cycling pulse when produced is presented. The set logic 161 will set mode control circuit 160 in response to output 146 presenting a logical 0 to enable reverse mode, unless inhibited by a logical 0 on input 166 or 167. Input 166 is a logical 0 whenever visual advance signals are being detected from the tape and input 167 is a logical 0 concurrent with the cycling of the projector in response to visual advance signals being detected from the tape. Thus, circuit 160, which controls the tape drive direction changes, is prohibited from being set to provide a logical 0 at its output 163 for reverse mode while either of the last two above-mentioned conditions is occurring. This ensures synchronization between the audio output and optical projector irrespective of when the manual switch 16 is changed from its first to its second position.

When manual switch 16 is changed from its second to its first position, output 146 which is connected to the input 140 to reset logic 170, changes from a logical 0 to a logical 1. Another input 171 of reset logic 170 is connected to the output 91 of circuit 89 (FIG. 2) at which positive projector cycling complete pulses are produced. The output of reset logic 170 is connected to mode control 160 and resets it in response to the logical 1 at output 146 presented with switch 16 in its first position plus the application of the next positive projector cycling complete pulse from output 91 to enable normal automatic forward mode. With the resetting completed by the pulse at output 91 of circuit 89 (FIG. 2), a dual function is performed. First, until the tape mode control circuit 160 is reset, it continues to transport the tape in a reverse direction to the visual advance signal preceding the audio signal that corresponds to the frame being shown by the optical projector when the switch 16 is changed from its second to its first position such that the tape drive of the device is returned to normal automatic forward operation prior to the beginning of the audio signal corresponding to such frame. Second, by resetting from the pulse at output 91 it is ensured that synchronization between the audio output and optical projector will be maintained by prohibiting tape drive direction changes while visual advance signals are being detected from the tape or the projector is cycling. If the projector is cycling when the manual switch 16 is changed, the device considers that the previously displayed slide frame is the frame being shown when the switch 16 is changed.

Output 162 of the tape drive mode 160 provides a signal which is a logical 1 in normal automatic forward operation and logical 0 in reverse tape drive at the second speed. The signal at output 162 is connected to control input 55 of bandpass filter 50 to change the timing of the filter during reverse tape drive at the second speed. Signal at output 162 is also connected to control input 104 of bandpass filter 100 to disable the filter during reverse tape drive. Signal at output 162 is also connected to the forward mode and enable logic 17 as later described.

An equalization change select logic 186 is also shown in FIG. 4 and is connected via conductor 189 to the output 162 of the tape drive mode circuit 160 to provide a signal at output 187 which is conected to control input 34 of preamp 30 when the tape drive is in reverse (a logical 0 at 162).

An audio mute circuitry 195 is also shown in FIG. 4 and is connected to receive its input from inverter 196 which is connected to the output 162 of flip-flop 160. Inverter gate 196, therefore, outputs a logical 0 in normal automatic forward mode and a logical 1 in reverse tape drive mode. In reverse tape drive mode circuitry 195 provides a logical 1 audio mute signal at its output 23 which is connected to the audio amplifier 22 (FIG. 1) to mute the aural output.

The reverse tape drive circuitry 198 is connected to the output of the tape drive mode control circuit 160 via the inverter 196 and provides an output 199 which is used to drive the cassette tape supply spindle (not shown) in reverse to provide the second tape drive speed. Circuitry 198 has inputs 200, 201 and 202. Input 200 is connected to the inverter 196 to receive a logical 1 whenever the tape mode circuit 160 is set to reverse mode. Input 201 is connected to output 52 of filter 50 at which detected visual advance signals are presented and input 202 is connected to output 86 at which positive projector cycling pulses are presented. The functioning of circuitry 198 in response to the signals received at inputs 201 and 202 will be described when circuit details for circuit 198 are given.

As previously described, when the reverse manual override switch 16 is changed from its second to its first position, the tape drive continues in reverse to the visual advance signal preceding the audio portion corresponding to the frame being shown by the projector such that the full audio portion of that slide can be reproduced later in forward mode. The tape drive, however, continues in reverse beyond this point because for synchronization ensuring reasons it is undesirable to change the tape drive mode while visual advance signals are being detected or the projector is cycling. Therefore, the tape mode control circuit 160 is reset to normal automatic forward operation by the positive projector cycling complete pulse provided at output 91 which connects with input 171. Thus, there is a backward slide change followed immediately by a forward slide change upon circuit 160 being rest. Such double slide change is inhibited by a double slide change inhibit circuit 210 under certain circumstances. The inhibit circuit 210 has a first and a second state. In its first state the inhibit circuit 210 enables visual advance signals detected from the tape to cycle the projector and in its second state inhibits visual advance signals detected from the tape from cycling the projector. If the projector is in the process of cycling when switch 16 is changed from its second to its first position, then the projector will be permitted to go through the double slide change (backward and forward) because the process has already started. However, if the projector is not cycling when the switch 16 is changed from its second to its first position, then the inhibit circuit 210 will be set to inhibit such a double slide change. Projector cycling is indicated in the circuitry by the negative projector cycling pulse presented at output $\overline{86}$ of the projector cycling pulse circuit 82 in FIG. 2.

The inhibit circuit 210 is preset to its second state (inhibit mode) by set logic 211 via the conductor 223 connecting the set logic 211 and circuit 210. Circuit 210 is preset whenever the tape mode circuit 160 is in its second state, the switch flip-flop 145 changes from its second state to its first state, and a projector cycling pulse does not exist. Input 212 to set logic 211 is obtained from inverter 196 and is a logical 1 whenever tape drive mode control circuit 160 is in its second state (reverse mode). Another input 214 to set logic 211 is connected to output 86 at which negative projector cycling pulses are presented. Another input 215 to set logic 211 is obtained from the output inverter 163. The input 215 changes from a logical 1 to a logical 0 when flip-flop 145 changes from its second to its first state to produce a brief negative pulse at the output of set logic 211 to preset the double slide change inhibit circuit 210 under the conditions previously described. When preset, output 219 of inhibit circuit 210 is a logical 0.

Inhibit circuit 210 is reset to its first state in response to the second internally generated projector completed cycling pulse 91 following the change of the reverse switch flip-flop 145 from its second to its first state. As previously described, when flip-flop 145 is in its first state, reset circuit 170 outputs a brief negative pulse on the occurrence of each projector completed cycling pulse at output 91. The first negative pulse out of circuit 170 resets tape mode control circuit 160. The output of circuit 160 is connected to circuit 210 via conductor 175 and serves to enable the resetting of circuit 210. Accordingly, with the output of circuit 160 made a logical 1 by the first negative pulse from reset circuit 170, circuit 160 via conductor 175 then enables the resetting of double slide change inhibit circuit 210 by the second negative pulse from reset circuit 170.

Output 219 of inhibit circuit 210 is fed back to input 147 of flip-flop 145. Until the double slide change inhibit circuit 210 is reset, the output 219 is a logical 0 preventing switch 16 from again changing the state of flip-flop 145 until the double slide change inhibit cycle is complete.

The projector command logic 18 of FIG. 1 is also set forth in more detail in FIG. 4 and comprises the projector forward select and drive circuit 240, the projector forward relay circuit 241, the projector reverse select and drive circuit 242 and the projector reverse relay circuit 243. Circuit 240 provides an output at 244 to operate relay circuit 241 when input 251 connected to the output 162 of tape drive mode control 160 is logical 1 (indicating the tape drive is in forward mode), input 252 connected to the output 219 of inhibit circuit 210 is a logical 1 (indicating a double slide change inhibit is not present) and input 253 is provided with a positive projector command pulse 84 from projector command pulse circuit 81 (FIG. 2). Operation of relay circuit 241 provides a short between outputs 257 and 258 of circuit 241 which are for connection to the remotely controllable projector. The short provided between outputs 257 and 258 serves to initiate a projector forward cycle.

Circuits 242 and 243 provide for projector reverse cycling. Circuit 242 provides an output at 245 to operate reverse relay circuit 243 when input 271 connected to the output of gate 196 is a logical 1 (indicating the tape drive is in reverse mode), input 272 connected to the output 219 of inhibit circuit 210 is a logical 1 (indicating a double slide change inhibit is not present) and input 253 is provided with a positive projector command pulse 84 from projector command pulse circuit 81 (FIG. 2). Operation of relay circuit 243 provides a short between outputs 277 and 278 of circuit 243 which are for connection to the remotely controllable projector. The short provided between outputs 277 and 278 serves to initiate a projector reverse cycle.

FIG. 5 is a more detail block diagram showing the forward mode and enable logic 17 of FIG. 1 and includes a momentary manual stop/start switch 290, a forward mode stop/start flip-flop 300, a stop lamp select and drive circuit 310 and a forward mode enable-disable circuit 320. The momentary stop/start switch 290 is shown in its nonactivated state to provide a logical 0 at 291, which connects to one input of a flip-flop circuit 295 used to provide switch contact bounce protection. Output 296 of flip-flop circuit 295 is a logical 1 when switch 290 is not activated and a logical 0 when switch 290 is activated. A connection 292 between switch 290 and flip-flop 295 provides a switch activated indication to flip-flop 295 in the form of a logical 0.

The forward mode stop/start flip-flop 300 controls both programmed stops from the magnetic tape and manual stops input via switch 290. Programmed stops are initiated at flip-flop input 301 connected to output 128 to receive a negative stop command complete pulse to preset flip-flop 300 to the stop condition which is indicated by a logical 1 at output 302 and a logical 0 at output 303. Such a programmed stop condition is removed by the operator activating switch 290 to toggle flip-flop 300 to remove the flip-flop stop condition. Manual stops are initiated during normal automatic forward operation by activating switch 290 to toggle flip-flop 300 to its stop condition. Such a manual stop is normally restarted by the operator again activating switch 290 to toggle flip-flop 300. An input 307 is provided for receiving the output at 162 of the tape drive mode control circuit 160 and serves to reset flip-flop circuit 300 should the reverse manual switch 16 be activated from a programmed stop mode.

Stop lamp select and drive circuit 310 provides an output 311 which is for connection to a stop indicator lamp (not shown). Input 312 is connected to negative program stop pulse $\overline{123}$ and another input is connected to output 303 of flip-flop 300 such that whenever a program stop signal is detected from the tape or stop/start flip-flop 300 is in the stop condition the stop lamp will be energized for the operator's information.

Forward mode disable circuitry 320 provides a logical 0 output signal at 322 to disable normal forward tape drive mode. This is accomplished by activating a pause solenoid (not shown) using the logical 0 output signal at 322 which retracts a pressure roller (not shown) from the capstan (not shown). The pause solenoid is activated during a program stopped mode, a manual stopped mode, and during reverse running of the tape at the second tape speed. An input 323 to circuitry 320 is connected to output 162 of tape drive mode control 160 and receives a logical 0 whenever reverse tape drive mode is enabled. Input 324 to circuitry 320 is connected to output 302 of flip-flop 300 to receive a logical 1 at input 324 whenever either a programmed or manual stop has been commanded. Another input 326 for circuitry 320 is connected to receive visual advance detection signal $\overline{52}$ to momentarily disable the output of flip-flop 300 should it be manual set to its stopped state while a visual advance signal is being detected from the tape.

Figure 6:
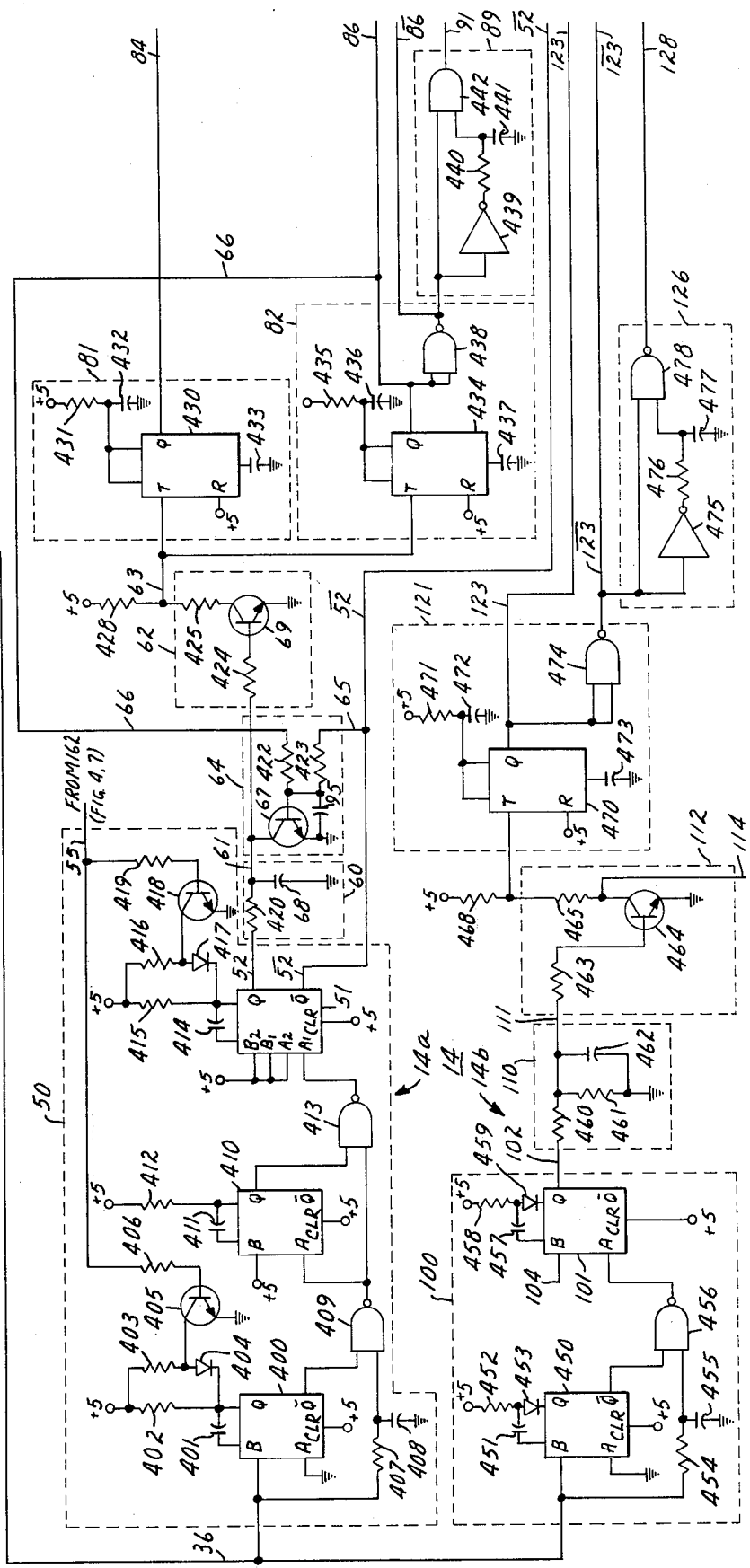
FIG. 6 is a circuit diagram for the block diagram of FIG. 2.

Schematic circuit details for circuitry to provide the functions indicated for the blocks described in connection with FIGS. 2, 4 and 5 are shown in FIGS. 6, 7 and 8, respectively. Portions of FIGS. 6, 7 and 8 are described when necessary to provide a more complete description and understanding of the operation of the circuitry.

Referring to FIG. 6, the circuitry for the various portions heretofore described in connection with FIG. 2 for the signal conditioning circuitry 12 and the signal detection and timing generation 14 are identified by dotted lines enclosing such portions with the dotted lines and other parts indentified using the same reference numbers as were used for such portions and parts in FIG. 2.

The preamplifier 30 has the input 34 which receives the signal from output 187 of the equalization change select logic 186 (FIG. 4). The signal received from output 187 changes the frequency response equalization of the preamplifier 30. This is needed during reverse tape drive at the second speed in order that the output 33 is approximately of nominal magnitude since during reverse tape drive the signal level induced in track 10 of the tape head is increased due to the greater changes of magnetic flux per unit time that results from the increased tape speed. Preamplifier circuit 30 includes a Norton type current amplifier 366 (part number RCA 3401) which connects to a positive 15 volts and ground for power.

Schmitt trigger circuit 31 includes a Norton type current amplifier 370 (Part number RCA 3401) which connects to a positive 15 volts and ground (0 volts) for power. Amplifier 370 outputs at 35 a square wave having a maximum output of positive 15 volts and a minimum output of ground (0 volts).

Digital pulse width discriminating bandpass filter 50 as previously described detects square wave signals presented at 36 having a positive half cycle width between 360 and 600 microseconds and a whole cycle width less than 1.5 milliseconds in normal automatic forward mode. Retriggerable multivibrator 400 (part number 74123) together with resistor 407, capacitor 408 and NAND gate 409 detect signals at 36 having a width greater than 360 microseconds. Multivibrator 400 is activated at its B input by the rising edge of the positive half cycle to provide at its $\overline{Q}$ output a negative pulse 360 microseconds in width. Resistor 407 and capacitor 408 form a delay circuit (hundreds of nanoseconds) such that the leading edge of the $\overline{Q}$ output reaches NAND gate 409 prior to the rising edge of the positive half cycle to maintain the output of NAND gate 409 at a logical 1. If the signal at 36 is less than 360 microseconds in width the output of gate 409 will remain a logical 1 and the pulse does not qualify. However, if the signal at 36 is greater than 360 microseconds in positive half cycle width the output of gate 409 will be a negative pulse whose width is the width of the signal at 36 minus 360 microseconds.

Retriggerable multivibrator 410 (part number 74123) and NAND gate 413 detect the maximum width of signals output from gate 409. Multivibrator 410 is activated at its A input by the falling edge (leading edge) of the gate 409 negative output pulse to provide at its Q output a positive pulse 240 microseconds in width. If the negative pulse output from gate 409 is greater than 240 microseconds, then the output of NAND gate 413 will remain a logical 1 and the signal at 36 does not qualify. However, if the negative pulse output from gate 409 is less than 240 microseconds, then the output of NAND gate 413 will be a negative pulse less than 240 microseconds in width; and the gate 413 negative pulse indicates the positive half cycle of the signal on 36 is between 360 and 600 microseconds.

Retriggerable multivibrator 51 (part number 74122) detects the maximum full cycle width of signals output from gate 413. Multivibrator 51 is activated at its A input by the falling edge (leading edge) of the gate 413 negative output pulse to provide at its Q output a positive 1.5 millisecond pulse and at its $\overline{Q}$ output a negative 1.5 millisecond pulse. If gate 413 outputs another negative pulse within 1.5 milliseconds, then the multivibrator Q output will remain a logical 1 for another 1.5 milliseconds and the $\overline{Q}$ output will remain a logical 0 for another 1.5 milliseconds. Thus, for a continuous sequence of signals at 36 whose positive half cycle is between 360 and 600 microseconds and whose full cycle is less than 1.5 milliseconds, the output 52 will be a continuous logical 1 and the output $\overline{52}$ will be a continuous logical 0.

During reverse tape drive mode at the second speed, input 55 to filter 50 is a logical 0 (rather than a logical 1) and the outputs of the multivibrators 400, 410 and 51, respectively, become 33 microseconds, 240 microseconds and 720 microseconds such that signals at 36 having a positive half cycle between 33 and 273 microseconds and a full cycle less than 720 microseconds are detected.

Digital pulse width discriminating bandpass filter 100 operates somewhat similar to filter 50. Retriggerable multivibrator 450 has a 2.35 millisecond output; and multivibrator 450, resistor 454, capacitor 455 and gate 456 operate analogously to multivibrator 400, resistor 407, capacitor 408 and gate 409 of filter 100. Retriggerable multivibrator 101 has a 9.24 millisecond output; and multivibrator 101 operates analogously to multivibrator 51. Thus, signals at 36 having a positive half cycle greater than 2.35 milliseconds and a full cycle less than 9.24 milliseconds are detected. Control input 104 is connected to output 162 of tape drive mode circuit 160 (FIG. 4, 7) such that filter 100 is disabled in the reverse mode when signals other than visual advance signals are to be disregarded.

The integrator circuit 60 comprising an R-C network which includes a resistor 420 connected to output 52 with a capacitor 68 connected from resistor 420 to ground. As long as a signal at 36 of the designated frequency for a visual advance signal is presented to bandpass filter 50, output 52 will be a logic 1 and integrator 60 provides an increasing signal level at its output 61 which appears across capacitor 68. The trigger circuit 62 is connected to output 61 and turns on to yield a logic 0 level at its output 63 whenever output 61 reaches the trigger level. A quick discharge circuit 64 is connected to the integrator circuit 60 and includes a transistor switch 67 connected across the capacitor 68. The transistor 67 conducts to discharge the integrator whenever a logic 1 level is presented to its base via one of two inputs 65 or 66 connected to the base via resistors 423 and 422, respectively. The output $\overline{52}$ of filter 50 is applied to input 65 and turns transistor switch 67 on to quickly discharge the integrator whenever a cycle of the visual advance signal of the designated frequency is not detected by the bandpass filter 50.

Referring to FIG. 7, the circuitry for the various portions heretofore described in connection with FIG. 4 are identified by dotted lines enclosing such portions with the dotted lines and other parts identified using the same reference numbers as were used for such portions and parts in FIG. 4.

Referring to the tape drive mode control circuit 160, which is a flip-flop circuit which includes NAND gates 508 and 509, an input 172 is shown which was not previously mentioned in connection with FIG. 4. The input 172 to NAND gate 509 is provided with a logical 0 for resetting the control circuit 160 during device power up and device master clear.

When describing the reverse tape drive circuitry 198 in connection with FIG. 4, it was indicated that the operation of the signals received at inputs 201 and 202 would be described later. Referring to the circuit details given in FIG. 7, input 200 receives a logical 1 from inverter 196 whenever the tape mode flip-flop is set to reverse mode. Input 201 receives the output $\overline{52}$ of filter 50 (FIGS. 2, 6) at which detected visual advance signals are presented and input 202 is connected to output 86 (FIGS. 2, 6) at which positive projector cycling pulses are presented. The output of NAND gate 203 is a logical 1 except for the portion of time when the signal at output 86 (FIGS. 2, 6) exceeds the signal at output $\overline{52}$ (FIGS. 2, 6) in which case it is a logical 0. For example, in reverse tape drive mode at four and one-half times the normal forward speed, the signal at output 86 lasts 0.9 seconds while the signal at output $\overline{52}$ lasts 0.1 seconds to cause the output of gate 203 to inhibit the tape drive for approximately 0.8 seconds each time the projector cycles in reverse. Such 0.8 second inhibit prevents the tape (at the increased speed) from getting ahead of the projector and allows the operator additional time to change the position of switch 16 from its second to its first position. When the tape drive is not being inhibited by the output of gate 203 and input 200 is a logical 1 (tape mode in reverse), NAND gate 204 outputs a logical 0 to hi-voltage, hi-current AND driver 205 which provides a logical 0 at its output 199 to enable the reverse tape drive spindle.

Referring to the J-K type flip-flop used for the double slide change inhibit circuit 210, an input 221 to the clear input of the J-K flip-flop is provided with a logical 0 during power up and device master clear.

Referring to the projector forward select and drive circuit 240 and the projector forward relay circuit 241 in FIG. 7, a positive pulse on the output of gate 250 turns transistor 254 on which activates relay coil 255 and closes relay contacts 256 to provide a short between outputs 257 and 258 which are for connection to the remotely controllable projector. Diode 259 is across relay coil 255 to suppress transients; and capacitor 260 and varactor 261 are across relay contacts 256 to suppress transients. A manual switch 262 when operated connects one side of the relay coil 255 to ground to provide independent manual projector forward cycling. A resistor 263 is connected to the collector of transistor 254 such that the output 264 can be used to turn on a lamp each time the projector cycles forward.

Similarly, with respect to the projector reverse select drive circuit 242 and the projector reverse relay circuit 243 of FIG. 7, a positive pulse on the output gate 270 turns transistor 274 on which activates relay coil 275 and closes relay contacts 276 to provide a short between outputs 277 and 278 of circuit 243, which are for connection to the remotely controllable projector. Diode 279 is across relay coil 275 to suppress transients; and capacitor 280 and varactor 281 are across relay contacts 276 to suppress transients. A manual switch 282 when operated connects one side of the relay coil 275 to ground to provide independent manual projector reverse cycling.

Referring to the circuitry of FIG. 8 for the forward mode and enable logic the input 305 for AND gate 308 of the flip-flop circuit 300 which was not shown in FIG. 5 activates the clear input 304 of the flip-flop when input 305 receives a logical 0 during device master clear or power up.

Further disclosure for the circuitry that has been set forth is provided by the data set forth below for the various components in terms of usable types and values.

| COMPONENT | VALUE OR TYPE |
|---|---|
| 2 Input NAND 170, 188,203,204,314, 325,375,409,413, 438,456,474,478, 503,508,518,519 | SN 7400 |
| Inverter 163,196,216,439, 475 | SN 7404 |
| 2 Input AND 442 | SN 7408 |
| 3 Input NAND 165,502 | SN 7410 |
| 3 Input AND 250,270,308 | SN 7411 |
| 4 Input NAND 213,509 | SN 7420 |
| J-K FLIP-FLOP 210,300 | SN 7476 |
| Multivibrator 51 | SN 74122 |
| Multivibrator 101,400,410,450 | SN 74123 |
| Timer 430,434,470 | LM 555 |
| Peripheral Driver 205,321 | SN 75461 |
| Transistors 353,405,418 69,254,274,315,373,464 67,197,359 | 2N3900 2N3416 2N6008 |
| Amplifiers 366,370 | RCA 3401 |
| Diodes 404,417,453,459 505,506,510 208,259,279,327 207 | GE DHD800 1N34A 1N4002 1N4749 |
| Varactor 261,281 | GE V220MA2A |
| Relays 255,275 | Guardian Electric 1475 Series |
| Capacitors 358 365 95 206,218,328,408,441,455,477 350 433,437,473 411 401 260,280 361,414 376 68,432,436,451,457,472 462 355 513 | 220 pf 390 pf 680 pf .0012 uf .0033 uf .01 uf .022 uf .033 uf .05 uf .1 uf 1 uf 1.5 uf 6.8 uf 10 uf 47 uf |
| Resistors 217,407,440,454,476 357 263,522 352 374,500,501,516,517 521,514,515 425,465 403 424,463 452 351,428,468,511,512 367,372 458 354,432,423 402,412 416 360,415,461 406,419,460 420 368 371,431,471 364 369 435 356 363 362 | 180 ohm 220 ohm 330 ohm 390 ohm 1 K ohm 1.5 K ohm 2.2 K ohm 3.3 K ohm 4.7 K ohm 5.6 K ohm 10 K ohm 15 K ohm 22 K ohm 33 K ohm 39 K ohm 43 K ohm 47 K ohm 56 K ohm 68 K ohm 100 K ohm 270 K ohm 300 K ohm 330 K ohm 620 K ohm 1.5 M ohm 5.1 M ohm 10 M ohm |

What is claimed is:

1. An audio-visual presentation device including magnetic tape drive means adapted to move a magnetic recording tape in a forward and a reverse direction at first and second speeds with said second speed being greater than said first speed, said tape having at least one region in which a series of audio signal portions is recorded with each of said audio signal portions being preceded by a visual advance control signal, said device providing audio output in response to said audio signal portions and adapted for providing electrical control of the cycling of an optical projector having a remotely and electrically controllable single frame advance mechanism in response to one of said visual advance signals whereby during a normal automatic forward operation of said tape drive means at said first speed said device provides audio output and optical projector control such that said audio output and a display by said optical projector remain in synchronization with the visual advance signal preceding each of such audio signal portions initiating a single frame cycle command to the optical projector, said device including a first manually actuated switch means having first and second positions, said switch means when in said first position providing normal automatic forward operation at said first tape drive speed and when in said second position providing reverse direction control to said tape drive means at said second tape drive speed with the visual advance signals on the tape automatically controlling reverse cycling of said optical projector, wherein the improvement comprises:

first circuit means responsive to each of said visual advance control signals for providing a logic control signal that indicates whether a visual advance control signal is being detected; and second circuit means operatively connected to said first switch means for responding to the position of said first switch and operatively connected to said first circuit means for responding to said logic control signal to provide a reverse control signal, when said first switch means is in said second position, for use in initiating reverse movement for the magnetic tape and for use with the single frame cycle commands in initiating reverse operation of the optical projector, provided said logic control signal indicates a visual advance control signal is not being detected, whereby synchronization of said audio output and said optical projector display is not lost due to operation of said first switch means to its second position at the time said logic control signal indicates a visual advance control signal is being detected.

2. The audio-visual presentation device according to claim 1 wherein a third circuit means is included which provides a second logic control signal for providing an indication of whether said optical projector is being cycled, said second circuit operatively connected to said third circuit means for responding to said second logic control signal to provide said reverse control signal, when said first switch is in said second position, provided said second logic control signal indicates said projector is not cycling whereby synchronization of said audio output and said optical projector display is not lost due to operation of said first switch means to its second position at the time said second logic control signal indicates the projector is cycling.

3. The audio-visual presentation device according to claim 2 wherein a fourth circuit means is included for providing a third logic control signal for providing an indication of whether a cycling of the optical projector is completed, said second circuit means operatively connected to said fourth circuit means for responding to said third logic control signal when said first switch means is in said first position to provide a forward control signal for use in initiating forward movement for the magnetic tape and for use with the single frame cycle commands in initiating forward operation of the optical projector, provided said third logic control signal indicates completion of an optical projector cycle, whereby, irrespective of the time said first switch means is placed in said first switch position from said second position, the provision of said forward control signal is dependent on the presentation of said third logic control signal when said first switch means is in said first switch position.

4. The audio-visual presentation device according to claim 3 wherein said second circuit means includes
  a. a reverse switch flip-flop electrically connected to said first switching means, said reverse switch flip-flop being in a first state when said first switch means is in said first position and a second state when said first switch means is in said second position;
  b. a tape drive mode control flip-flop for controlling the direction of the tape drive, said tape drive mode control flip-flop having first and second states for providing said forward control signal and said reverse control signal, respectively, and being connected to said tape drive means for causing said tape drive means to operate in the forward direction in response to said first state and for causing said tape drive means to operate in the reverse direction in response to said second state; and
  c. reverse mode control logic connected to said reverse switch flip-flop and said tape drive mode control flip-flop and responsive to said first-mentioned logic control signal and said second logic control signal for
     1. controlling the setting of said tape drive mode control flip-flop to its second state when said reverse switch flip-flop is in its second state and
     2. responsive to said third logic signal for controlling the resetting of said tape drive mode control flip-flop to its first state after said reverse switch flip-flop has been changed from its second to its first state.

5. The audio-visual presentation device according to claim 4 wherein said second circuit means further includes
  a. a double frame change inhibit flip-flop having a first state for enabling visual advance signals detected from said tape to command said optical projector to advance and having a second state for inhibiting visual advance signals detected from said tape from commanding said optical projector, and
  b. double frame change mode control logic connected to said reverse switch flip-flop and said tape drive mode control flip-flop and responsive to detection of said second control logic signal for
     1. setting said double frame change inhibit flip-flop to its second state in response to said tape drive mode control flip-flop being in its second state, said reverse switch flip-flop changing from its second state to its first state and said second control logic signal indicating the projector is not cycling, and
     2. resetting said double frame change inhibit flip-flop to its first state in response to the trailing edge of the second one of said second control logic signals indicating the projector is cycling following a change of said reverse switch flip-flop from its second to its first state.

6. The audio-visual presentation device according to claim 1 wherein a third circuit means is included for providing a second logic control signal for providing an indication of whether a cycling of the optical projector is completed, said second circuit means operatively connected to said third circuit means for responding to said second logic control signal when said first switch means is in said first position to provide a forward control signal for use in initiating forward movement for the magnetic tape and for use with the single frame cycle commands in initiating forward operation of the optical projector, provided said second logic control signal indicates completion of an optical projector cycle, whereby, irrespective of the time said first switch means is placed in said first switch position from said second position, the provision of said forward control signal is dependent on the presentation of said second logic control signal when said first switch means is in said first switch position.

7. An audio-visual presentation device including magnetic tape drive means adapted to move a magnetic recording tape in a forward and reverse direction at first and second speeds with said second speed being greater than said first speed, a said tape having at least one region in which a series of audio signal portions are recorded with each of said audio signal portions being preceded by a visual advance control signal, said device providing audio output in response to said audio signal portions and adapted for providing electrical control of the cycling of an optical projector having a remotely and electrically controllable singal frame advance mechanism in response to one of said visual advance signals whereby during a normal automatic forward operation of said tape drive means at said first speed said device provides audio output and optical projector control such that said audio output and a display by said optical projector remain in synchronization with the visual advance signal preceding each of such audio signal portions initiating a single frame cycle command to the optical projector, said device including a first manually actuated switch means having first and second positions, said switch means when in said first position providing normal automatic forward operation at said first tape drive speed and when in said second position providing reverse direction control to said tape drive means at said second tape drive speed with the visual advance signals on the tape automatically controlling reverse cycling of said optical projector, wherein the improvement comprises:
  first circuit means for providing a logic control signal that indicates whether the optical projector is cycling; and
  second circuit means operatively connected to said first switch means for responding to the position of said first switch and operatively connected to said first circuit means for responding to said logic control signal to provide a reverse control signal, when said first switch means is in said second position, for use in initiating reverse movement for the magnetic tape and for use with the single frame cycle commands in initiating reverse operation of the optical projector, provided said first logic control signal indicates the optical projector is not being cycled, whereby synchronization of said audio output and said optical projector display is not lost due to the operation of said first switch means to its second position at the time said logic control signal indicates the projector is cycling.

8. The audio-visual presentation device according to claim 7 wherein a third circuit means is included for providing a second logic control signal for providing an indication of whether a cycling of the optical projector is completed, said second circuit means operatively connected to said third circuit means for responding to said second logic control signal when said first switch means is in said first position to provide a forward control signal for use in initiating forward movement for the magnetic tape and for use with the single frame cycle commands in initiating forward operation of the optical projector, provided said second logic control signal indicates completion of an optical projector cycle, whereby, irrespective of the time said first switch means is placed in said first switch position from said second position, the provision of said forward control signal is dependent on the presentation of said second logic control signal when said first switch means is in said first switch position.

9. An audio-visual presentation device including magnetic tape drive means adapted to move a magnetic recording tape in a forward direction, said tape having at least one region in which audio signal portions are recorded with each of said audio signal portions being preceded by a visual advance control signal, said device providing audio output in response to said audio signal portions and adapted for providing electrical control of the cycling of an optical projector having a remotely and electrically controllable single frame advance mechanism in response to one of said visual advance signals whereby during a normal automatic forward operation of said tape drive means said device provides audio output and optical projector control such that said audio output and a display by said optical projector remain in synchronization with the visual advance signal preceding each of such audio signal portions initiating a single frame cycle command to the optical projector, said device having electrical circuitry for detecting the visual advance signals on the magnetic tape and providing said single frame advance command to said projector in response to each such visual advance signal, said electrical circuitry comprising:
 a. filter means connected for receiving said visual advance single and responding to each cycle of said visual advance signal of said visual advance signal that is of a designated frequency band to provide a first signal, said filter means providing a second signal when a signal cycle of said designated frequency band is not received,
 b. signal producing means connected to said filter means to receive said first and second signals, said signal producing means having an output at which an output signal is produced which increases in magnitude so long as said first signal is received, said signal producing means removing said output signal in response to said second signal, and
 c. trigger means connected to the output of said signal producing means for providing a single frame advance command to said projector in response to said output signal increasing to a magnitude sufficient to trigger said trigger means.

10. The audio-visual presentation device according to claim 9 wherein
 said signal producing means comprises a. an integrator connected to said filter means to receive said first signal and having an output which is said output of said signal producing means, and
 b. a quick discharge circuit connected to receive said second signal and connected to said integrator for discharging said integrator whenever said second signal is present to thereby remove any signal present at said output of said integrator.

11. An audio-visual presentation device including magnetic tape drive means adapted to move a magnetic recording tape in a forward and a reverse direction at first and second speeds with said second speed being greater than said first speed, said tape having at least one region in which a series of audio signal portions is recorded with each of said audio signal portions being preceded by a visual advance control signal, said device providing audio output in response to said audio signal portions and adapted for providing electrical control of the cycling of an optical projector having a remotely and electrically controllable single frame advance mechanism in response to one of said visual advance signals whereby during a normal automatic forward operation of said tape drive means at said first speed said device provides audio output and optical projector control such that said audio output and a display by said optical projector remain in synchronization with the visual advance signal preceding each of such audio signal portions initiating a single frame cycle command to the optical projector, said device including a first manually actuated switch means having first and second positions, said switch means when in said first position providing normal automatic forward operation at said first tape drive speed and when in said second position providing reverse direction control to said tape drive means at said second tape drive speed with the visual advance signals on the tape automatically controlling reverse cycling of said optical projector, wherein the improvement comprises:
 first circuit means for providing a logic control signal that indicates whether a cycling of the optical projector is completed; and
 second circuit means operatively connected to said first switch means for responding to the position of said first switch and operatively connected to said first circuit means for responding to said logic control signal when said first switch means is in said first position to provide a forward control signal for use in initiating forward movement for the magnetic tape and for use with the single frame cycle commands in initiating forward operation of the optical projector, provided said logic control signal indicates completion of an optical projector cycle, whereby, irrespective of the time said first switch means is placed in said first switch position from said second position, the provision of said forward control signal is dependent on the presentation of said logic control signal when said first switch means is in said first switch position.

12. An audio-visual presentation device according to claim 11 wherein said second circuit means includes a double frame change inhibit circuit responsive to said second logic control signal for inhibiting a double frame change if said second logic control signal indicates the projector is not cycling when said first switching means is returned from its second to its first position.

* * * * *

UNITED STATES PATENT AND TRADEMARK OFFICE
CERTIFICATE OF CORRECTION

PATENT NO. : 4,072,989
DATED : February 7, 1978
INVENTOR(S) : ROBERT EUGENE GRANT It is certified that error appears in the above-identified patent and that said Letters Patent are hereby corrected as shown below:

Column 4, line 11, change "emobidment" to -- embodiment --.

Column 4, line 30, change "rsponse" to -- response --.

Column 5, line 65, change "times" to -- timer --.

Column 6, line 39, change "connectd" to -- connected --.

Column 7, line 37, change "position'" to -- position, --.

Column 8, line 11, change "163" to -- 162 --.

Column 9, line 31, change "Threfore" to -- Therefore --.

Column 9, line 37, change "rest" to -- reset --.

Column 10, line 61, change "detail" to -- detailed --.

Column 11, line 66, change "indentified" to -- identified --.

Column 17, line 39, insert a "comma" (,) after -- state --.

Column 18, line 4, change "1" to -- 7 --.

Column 18, line 33, change "singal" to -- single --.

Column 19, line 4, change "7" to -- 1 --.

Column 19, line 47, change "single" to -- signals --.

Column 19, line 48, after "signal" (first occurrence) delete -- of said visual advance signal --.

UNITED STATES PATENT AND TRADEMARK OFFICE
CERTIFICATE OF CORRECTION

PATENT NO. : 4,072,989
DATED : February 7, 1978
INVENTOR(S) : ROBERT EUGENE GRANT It is certified that error appears in the above-identified patent and that said Letters Patent are hereby corrected as shown below:

Column 19, line 51, change "signal" to -- single --.

Column 19, line 51, after "cycle" insert -- of said visual advance signal --.

Signed and Sealed this

Fifteenth Day of August 1978

[SEAL]

Attest:

RUTH C. MASON
Attesting Officer

DONALD W. BANNER
Commissioner of Patents and Trademarks